United States Patent [19]
Hermsmeier et al.

[11] Patent Number: 5,574,897
[45] Date of Patent: Nov. 12, 1996

[54] SYSTEM MANAGED LOGGING OF OBJECTS TO SPEED RECOVERY PROCESSING

[75] Inventors: David L. Hermsmeier, Oronoco; Gary R. Ricard, Rochester; John J. Vriezen, Rochester; Larry W. Youngren, Rochester, all of Minn.

[73] Assignee: International Business Machines Corporation, Armonk, N.Y.

[21] Appl. No.: 954,641

[22] Filed: Sep. 30, 1992

[51] Int. Cl.$^6$ .................................................... G06F 7/00
[52] U.S. Cl. ................................................ 395/600; 395/700
[58] Field of Search ................................... 395/700, 600; 364/DIG. 1, 285, 285.1, 285.2, 285.3, 282.1

[56] References Cited

U.S. PATENT DOCUMENTS

| | | | |
|---|---|---|---|
| 4,459,658 | 7/1984 | Gabbe et al. | 364/200 |
| 4,774,657 | 9/1988 | Anderson et al. | 364/200 |
| 4,819,156 | 4/1989 | DeLorme et al. | 364/200 |
| 4,945,474 | 7/1990 | Elliott et al. | 364/200 |
| 5,043,866 | 8/1991 | Myre, Jr. et al. | 364/200 |
| 5,043,871 | 8/1991 | Nishigaki et al. | 364/200 |
| 5,065,311 | 11/1991 | Masai et al. | 364/200 |

FOREIGN PATENT DOCUMENTS

| | | | |
|---|---|---|---|
| 58-149527 | 9/1983 | Japan | G06F 1/00 |

OTHER PUBLICATIONS

Lehman et al "A Recovery Algorithm For a High Performance Memory Resident Data Base System," Dec. 1987 pp. 104–117.

Proceedings of Assoc. For Computing Machinery Special Interest Group 1987 Annual Conference vol. 16, No. 3.

Primary Examiner—Raymond J. Bayerl
Assistant Examiner—A. Katbab
Attorney, Agent, or Firm—Owen J. Gamon

[57] ABSTRACT

System control over the logging of objects in order to meet the user specified recovery requirements. Under the fixed recovery time environment, the user chooses a length of time to be spent on object recovery, and the system dynamically manages the logging of objects to meet this time. The shorter the time the user chooses, the more objects the system will log, and the more performance degradation there will be as a result of the logging at run-time. The user may partition storage into Auxiliary Storage Pools (ASPs), which are groups of non-volatile storage, and then specify the recovery time on a per ASP basis. Under the minimal impact environment, the system dynamically manages the objects to be logged such that the object logging has a minimal impact on run-time performance.

24 Claims, 14 Drawing Sheets

| Bucket | Internal Threshold | Current Exposure | | | | Max Exposure |
|---|---|---|---|---|---|---|
| | | CPU 1 | CPU 2 | ... | CPU n | |
| 1 | 5 secs | | | | | |
| 2 | 12 secs | | | | | |
| ⋮ | ⋮ | ⋮ | ⋮ | ⋮ | ⋮ | ⋮ |
| 1023 | 15 hrs | | | | | |
| 1024 | infinity | | | | | |
| 1025 | always logged (See Exposed Object Index section) | | | ... | | |

Tuning Table

FIG. 2

Calculating Max Exposure

| Internal Threshold | Current Exposure | | | | | | | Max Exposure |
|---|---|---|---|---|---|---|---|---|
| | CPU 1 | CPU 2 | CPU 3 | Maximum Exposure Work Area (temporary area used to calculate max exposure) | | | | |
| | | | | CPU 1 | CPU 2 | CPU 3 | Comments | |
| 5 secs | | | | 0 | 0 | 0 | previous sum: (add max value to min current exposure) | |
| | 5 | 3 | 1 | = 5 | 3 | 1 | take maximum | →5 |
| 12 secs | | | | 5 | 3 | 1 | previous sum: (add max value to min current exposure) | |
| | 10 | 10 | 7 | = 13 | 11 | 12 | take maximum | →13 |
| 25 secs | | | | 13 | 11 | 12 | previous sum: (add max value to min current exposure) | |
| | 40 | 25 | 31 | = 51 | 38 | 43 | take maximum | →51 |

FIG. 3

Exposed Object Index Entries for an Index

| '00'X | Estimated rebuild time | ASP# | Index address | Index is housed in bucket 1025 |
|---|---|---|---|---|

| '01'X | ASP# | Estimated rebuild time | Index address | Index is housed in bucket 1025 |
|---|---|---|---|---|

505

| '02'X | Rate of Key change | ASP# | Index address | Estimated rebuild time |
|---|---|---|---|---|

505

| '03'X | ASP# | Rate of Key change | Index address | Estimated rebuild time |
|---|---|---|---|---|

FIG. 5

Open Object

Check for Surrogate Logging

Update Object

Fixed Recovery Time Environment
User Adjustment of External Recovery Time

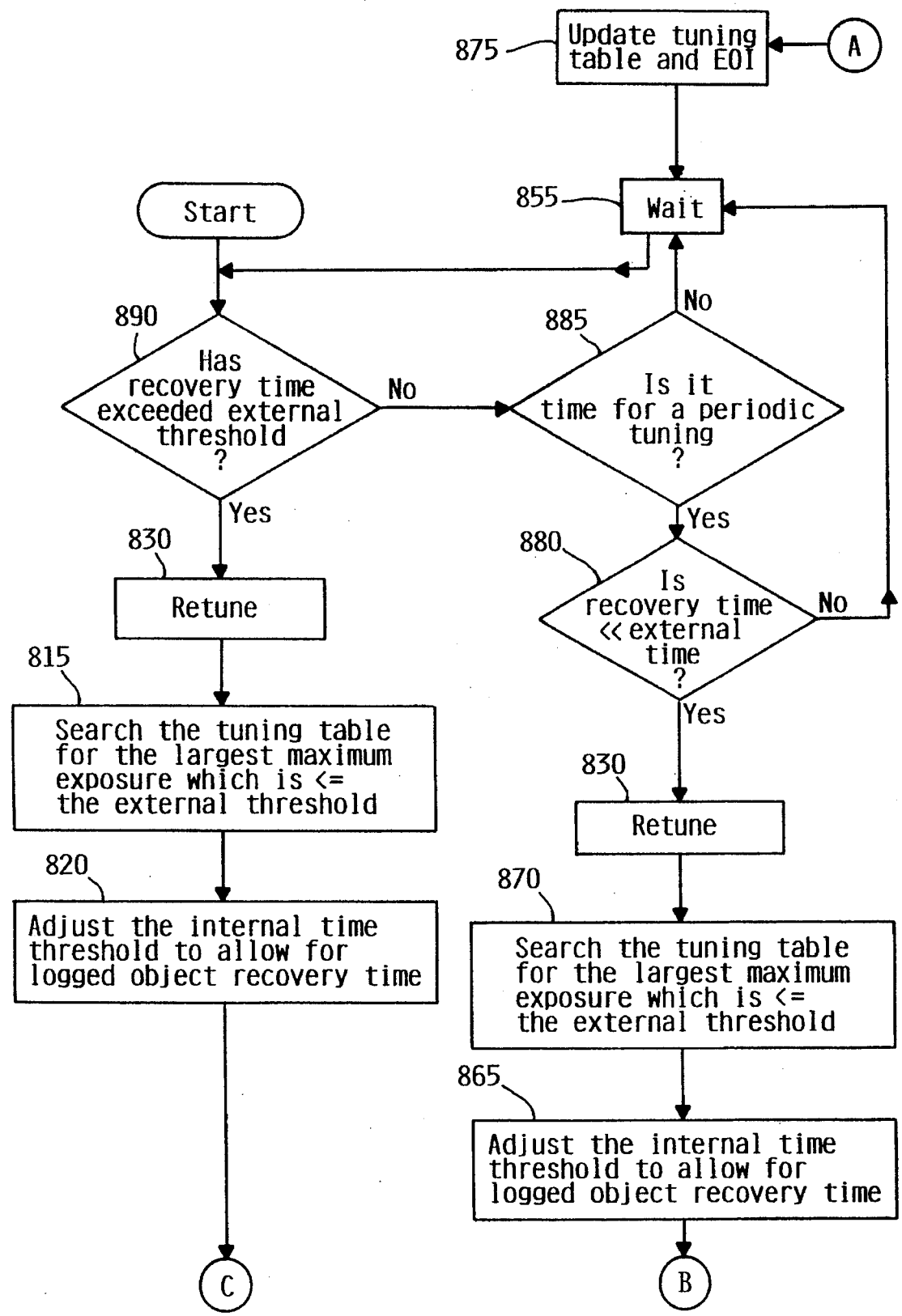
Fixed Recovery Time Environment System Tuning FIG. 8a

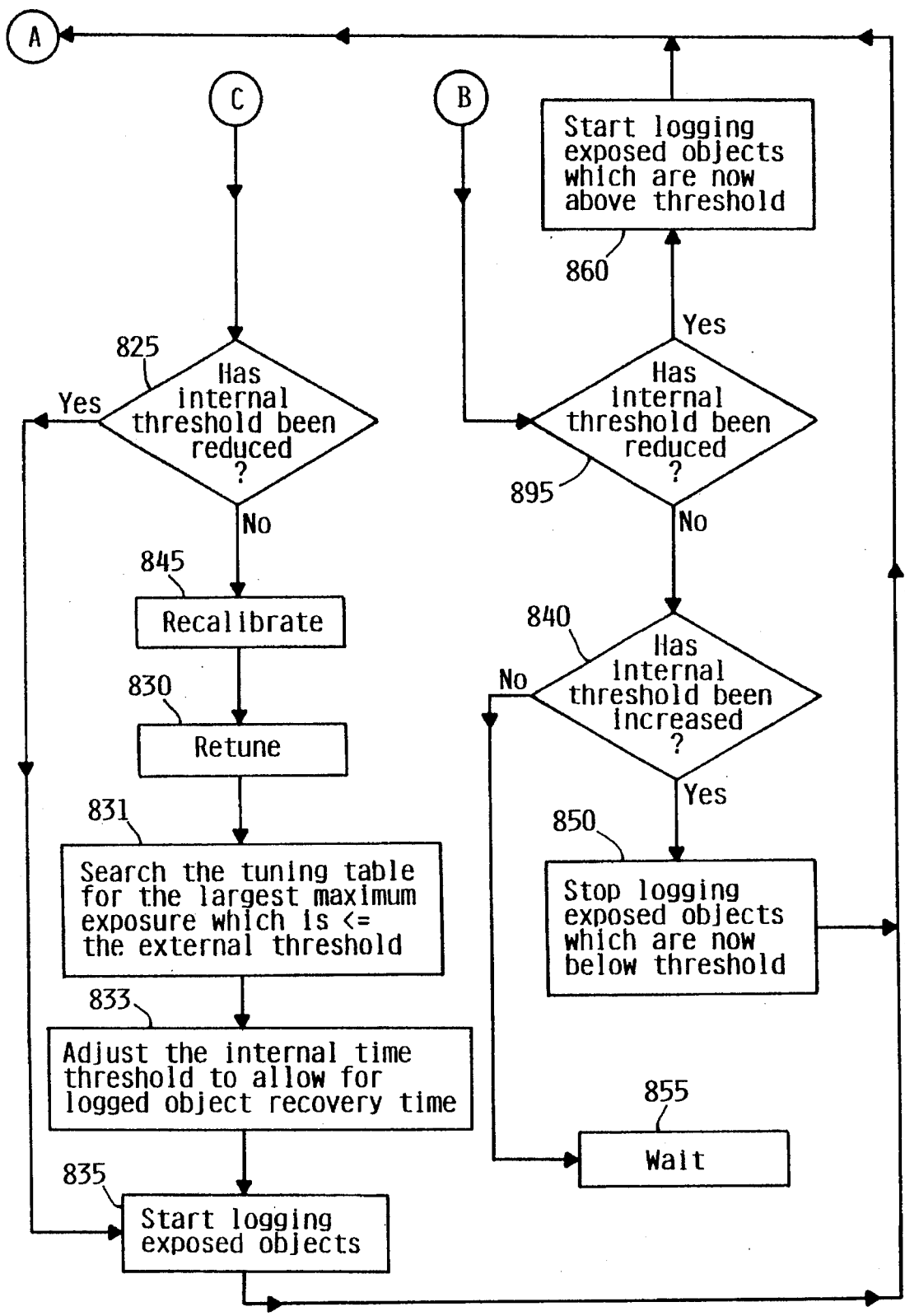
Fixed Recovery Time Environment System Tuning FIG. 8b

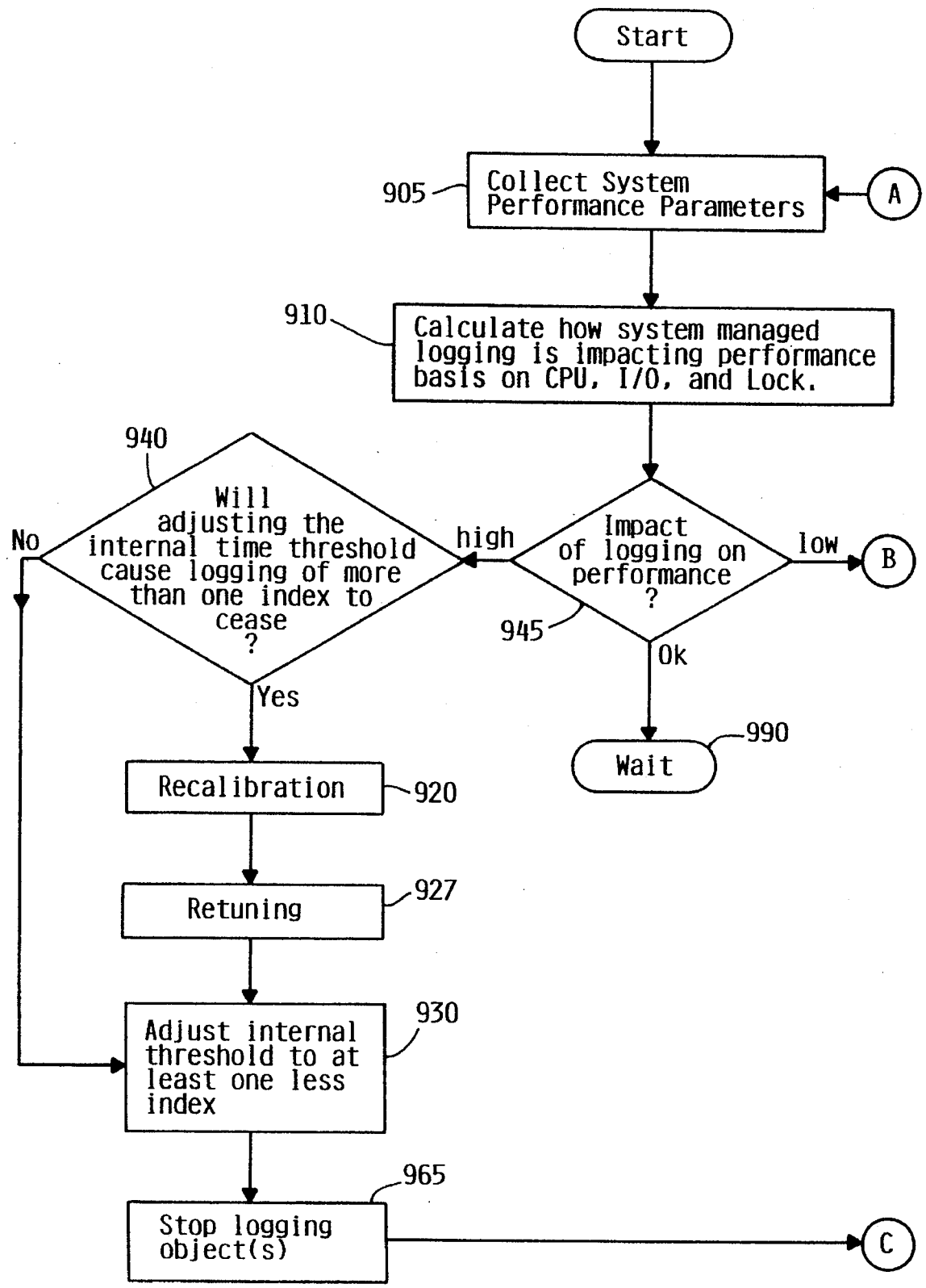
Tuning Task - Minimal Impact Environment FIG. 9a

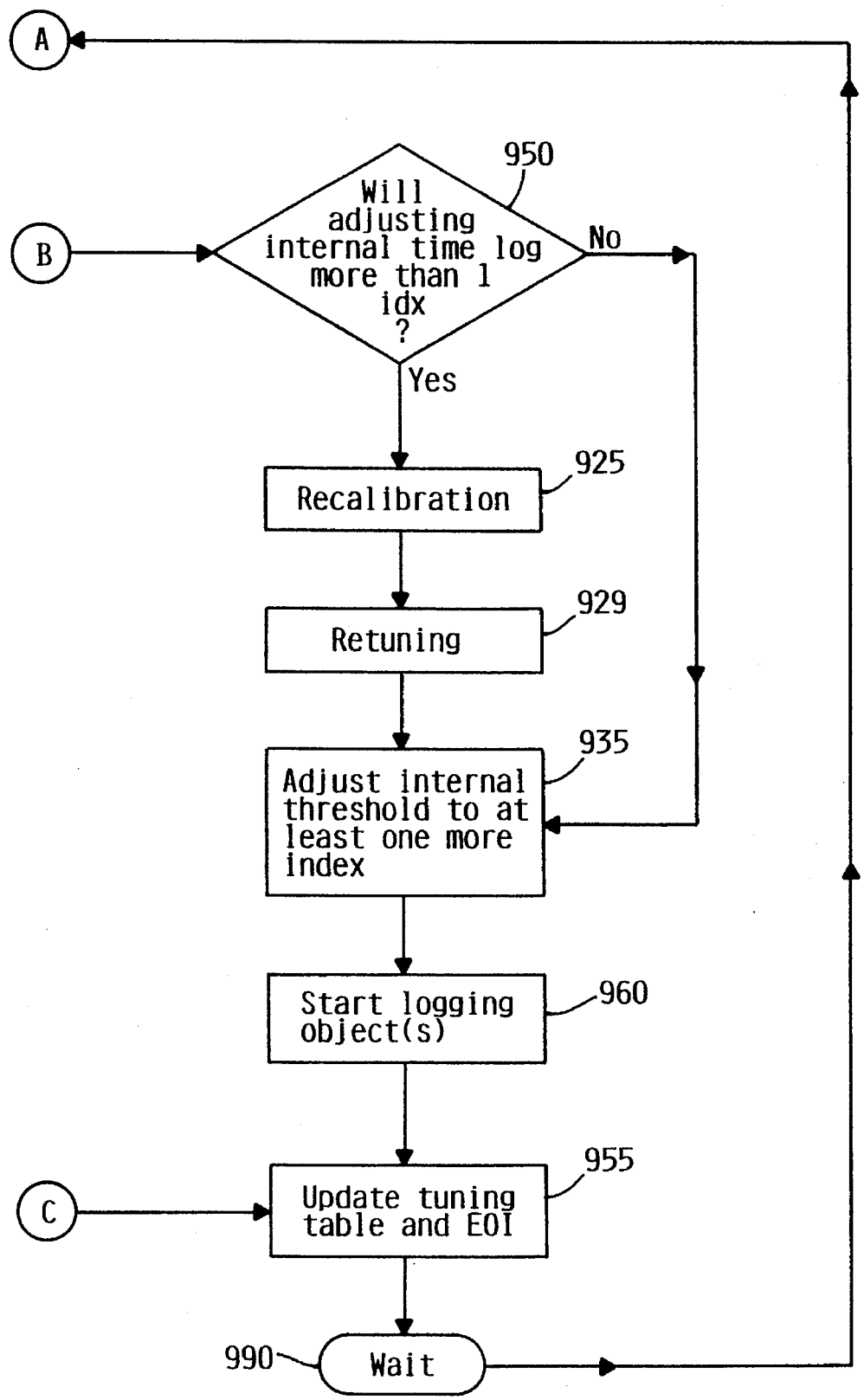
Tuning Task - Minimal Impact Environment  FIG. 9b

SYSTEM MANAGED LOGGING OF OBJECTS TO SPEED RECOVERY PROCESSING

BACKGROUND OF THE INVENTION

The present invention is related to recovery of database objects in a computer system, and in particular to the system management of which objects to log in order to speed recovery processing after an abnormal system termination, while minimizing run-time impacts.

In a database system, recovery processing is normally required after an abnormal system termination in order to ensure that the integrity of the data within the database is preserved. Typically, database objects that were open at the time of the termination may need selective recovery actions performed. Objects are files of stored information, and usually include header data that describes or encapsulates the stored information.

Databases may be comprised of tables, that contain rows, and database indexes that provide ordered access to these rows, based on key values contained in the rows. As an example, rows might contain information such as a list of employees, their serial numbers and telephone numbers. One index might be ordered chronologically by employee serial number, while another index might be ordered alphabetically by employee name. When changes are made to the rows, database indexes over the table may need to be updated in order to keep tile indexes synchronized with the tables to which they refer.

When the system terminates abnormally, e.g. a power failure, the tables and the related indexes might not be synchronized. Some transactions may have caused index(es) to be updated, but the associated rows may not have been updated on non-volatile storage at the time the system terminated, or vice versa. Recovery processing after an abnormal system termination can thus include reading every row in every table, and rebuilding each of the indexes from the table rows. Depending on the number, size, and complexity of the database objects that are open when the system terminates, this recovery processing may take hours or even longer, during which time these objects may not be available to the user. This lengthy unavailability may be unacceptable to many users.

A well known approach for alleviating the lengthy time to recover objects after an abnormal system termination is through the use of a write-ahead log to record changes to the data objects prior to the changes being made to the objects in the database itself. Under this approach, the user specifies which objects he would like logged, and then the system logs or writes all changes for the objects to a separate log in non-volatile storage so that in the event of a failure, the log can be read and only the suspect data need be fixed.

While logging provides good data recovery and reduces the amount of time taken for post abnormal system termination recovery, it does so at the price of substantial run-time performance degradation due to the extra processing needed to log all the changes. For many users, this run-time performance degradation is unacceptable.

SUMMARY OF THE INVENTION

System control over the logging of objects is provided. The system chooses what objects should be logged to meet the user specified recovery requirements. Thus, the user is relieved of the responsibility of deciding exactly what objects are the best candidates for logging protection. Objects that the system elects to log are called "implicitly logged".

For those users who must have high system availability and cannot afford long recovery times following abnormal system termination, the fixed recovery time environment is provided. Under this environment, the user chooses a length of time (external threshold) that he is willing to spend recovering the data base, and the system dynamically manages the logging of objects to meet this time. The shorter the time he chooses, the more objects the system will log, and the more performance degradation there will be as a result of the logging at run-time.

The user may partition his storage into Auxiliary Storage Pools (ASPs), which are groups of non-volatile storage, and then specify the recovery time (ASP specific external threshold) on a per ASP basis. This allows the user to assign applications to a particular ASP and thus control the amount of time spent recovering a particular application, so that the data for a critical application can have a short recovery time while the recovery for non-critical applications can be postponed until a later, more convenient time.

For those users who must have high run-time performance, the minimal impact environment is provided. This environment provides for a varying degree of data object protection based upon current system resource utilization. The system dynamically manages the objects to be logged such that the maximum amount of protection through logging is provided while minimizing the impact on run-time performance.

The user is provided the capability to switch between the fixed recovery time and minimal impact environments as his needs change.

BRIEF DESCRIPTION OF THE DRAWINGS

FIG. 2 shows a logical view of a Tuning Table used to manage objects selected for logging.

FIG. 3 illustrates a process used to determine the recovery time for the current environment.

FIG. 5 5 shows the Exposed Object Index and entry formats.

FIG. 8 is a flow diagram for the Fixed Recovery Time environment when the system determines whether or not the user's external time for recovery FIG. 9 is a flow diagram for the Minimal Impact environment when the system determines whether or not the performance impact is acceptable.

DETAILED DESCRIPTION OF THE PREFERRED EMBODIMENT

Figure 1:
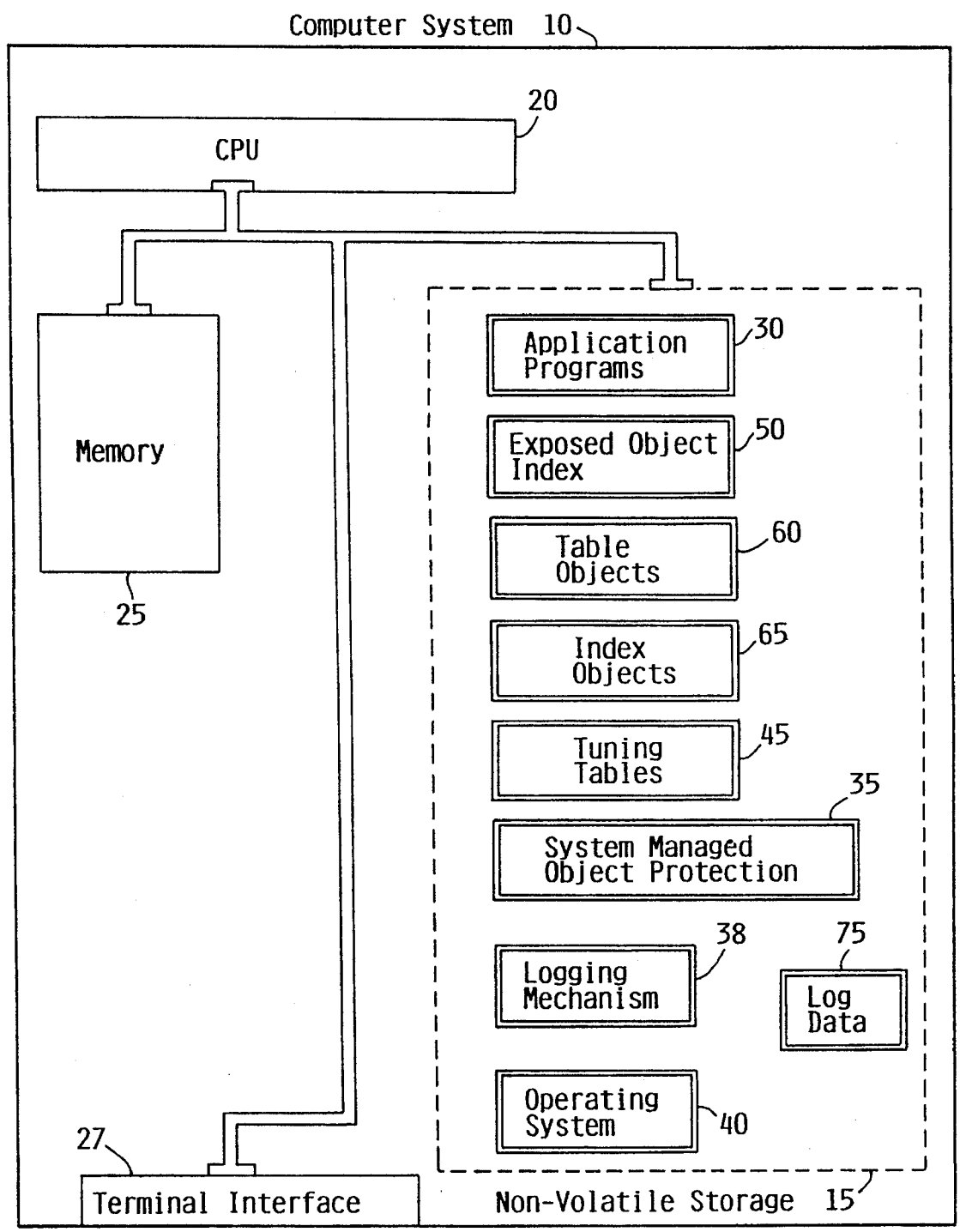
FIG. 1 shows a computer system implementing one preferred embodiment.

System control over the logging of objects is provided. The system will choose what objects should be logged to meet the user specified recovery requirements. Thus, the user is relieved of the responsibility of deciding exactly what objects are the best candidates for logging protection. Objects that the system elects to log are called "implicitly logged".

For those users who must have high system availability and cannot afford long recovery times following abnormal system termination, the Fixed Recovery Time environment is provided. Under this environment, the user chooses a length of time that he is willing to spend recovering the data base, and the system dynamically manages the logging of objects to meet this time. The shorter the time he chooses, the more objects the system will log, and the more performance degradation there will be as a result of the logging at run-time.

The user may partition his storage into Auxiliary Storage Pools (ASPs), which are groups of non-volatile storage, and then specify the recovery time on a per ASP basis. This allows the user to assign applications to a particular ASP and thus control the amount of time spent recovering a particular application, so that the data for a critical application can have a short recovery time while the recovery for non-critical applications can be postponed until a later, more convenient time.

For those users who must have high run-time performance, the minimal impact environment is provided. This environment provides for a varying degree of data object protection based upon current system resource utilization. The system dynamically manages the objects to be logged such that the maximum amount of protection through logging is provided while minimizing the impact on run-time performance.

The user is provided the capability to switch between the Fixed Recovery Time and Minimal Impact environments as his needs change.

The preferred embodiment is explained in terms of index recovery because indexes are typically the most costly objects to recover after an abnormal system termination, with the time to rebuild an index being the chief contributor to this recovery time. However, the invention applies to any object whatsoever provided that the following conditions are met:

1. The transactions affecting the object must be able to be logged, and when logged, the recovery time for the object must be substantially reduced;
2. The logged and non-logged recovery times for the object must be susceptible to estimation and the estimation must be able to be performed in substantially less time than the time that would be required to perform the actual recovery;
3. The quantity of dynamic change which will warrant that an object be re-inspected to determine if it must change from logged to not logged state or vice-versa must be able to be estimated; and
4. The system must be able to determine when an object becomes exposed and when an object becomes non-exposed. An object is exposed when it might possibly require recovery if the system were to abnormally terminate.

In order to reduce recovery time, the system will choose to log a subset of the possible objects eligible for logging. The cost at run-time to log is proportional to the amount of change an object incurs while the impact on recovery time for an object is a function of its size. In general, it is better to choose larger objects to log rather than smaller ones since log recovery time remains relatively constant regardless of the object's size. This is certainly true if the rate of change is the same for a given set of objects. The approach then, is to log the largest objects first, working toward the smaller objects until either performance degrades (in the case of the minimal impact environment) or until the recovery time of the remaining objects is at or below the user specified external thresholds (in the case of the fixed recovery environment).

Unfortunately, it is not always the case that change activity from object to object is constant. In some cases, rather large objects undergo a high rate of change. In this case, it is desirable to consider logging several smaller objects with lower rates of change so that for lower run-time cost, an equal or higher level of protection can be achieved.

It is not sufficient to just do a single analysis of the database system to determine which and how often objects are to be used and then base logging decisions upon those results. Large database installations tend to be highly variable based on time of day and time of month. Periodic retuning must be done to accommodate these dynamic changes. There are several dynamic factors that must be considered. First, rate of change activity should be considered. As an object becomes more highly used, it may be more advantageous to dispense with logging it in favor of logging other objects. Another factor is object growth. An object may not be logged at one point due to its small size and be fairly quickly recovered without a log. However, a single job may add data to the object to the point where it is so large that logging is then warranted. A third factor is the opening and closing of objects. When an object is closed, it needs no recovery as it is on non-volatile storage. While it costs virtually nothing to log an object that is closed, it also does not reduce the recovery time, since no recovery is needed whether the object is logged or not.

The invention's solution to managing the objects to be logged is to estimate the amount of time to rebuild each object. Then an internal rebuild time threshold is chosen such that any object that exceeds the internal rebuild time threshold is selected for logging. The initial internal rebuild time threshold is chosen arbitrarily and will converge to a more appropriate value as described by the tuning methods below.

The system is analyzed to determine if the internal rebuild threshold is sufficient to meet the chosen environment's criteria. For the fixed recovery time environment, the threshold must be small enough to assure that the user specified external threshold time will not be exceeded. For the minimal impact environment, the internal rebuild time threshold is chosen to be as small as possible, without adversely affecting system run-time performance. Further, there are exceptions to the rule whereby rapidly changing objects that would otherwise be logged are bypassed in favor or smaller surrogate objects (with low rates of change) that would otherwise not be logged. The invention herein describes the mechanism used for deciding which objects to log, both by choosing and maintaining the proper threshold, and by deciding which objects should participate in surrogate object journaling.

FIG. 1 shows a block diagram of a typical computer system suitable for operation of the present invention. In the preferred embodiment, computer system 10 is an IBM Application System/400 midrange computer; however, other systems such as personal computers and mainframe computer systems could also be used. Contained within computer system 10 are non-volatile storage 15, CPU 20, memory 25, and terminal interface 27. Non-volatile storage 15, as secondary memory, may be a magnetic disk drive, an optical storage device, or a combination of different storage devices. CPU 20 is responsible for executing the software programs that have been loaded into memory 25. Terminal interface 27 allows developers and users to communicate with computer system 10, normally through a programmable workstation.

Non-volatile storage 15 contains application programs 30, system managed object protection programs 35, operating system 40, logging mechanism 38, tuning tables 45, exposed object index 50, table objects 60, index objects 65, and log data 75. While storage 15 is shown as a monolithic entity, it should be understood that it may comprise a variety of devices, and that all programs and files shown will not necessarily be contained in any one device. For example, portions of application programs 30 and operating system 40 will typically be loaded into primary memory 25 to execute, while source data files will typically be stored on magnetic or optical disk storage devices.

FIG. 2 shows a logical view of the Tuning Table used to manage the objects selected for logging. The Tuning Table is divided into Buckets (200). Each bucket corresponds to a group of indexes with similar rebuild times. By way of illustration, bucket 1 (210) contains indexes with rebuild times of from 0 to 5 seconds, while bucket 2 (230) contains indexes with rebuild times of from 5 to 12 seconds. In the preferred embodiment, buckets with indexes of low rebuild times have a narrow time spread while buckets with indexes of high rebuild times have a wide time spread. Also, the number of buckets in the preferred embodiment is 1024.

There is a system wide tuning table and a tuning table for reach ASP. In the fixed recovery time environment, the system wide tuning table is used to assure that the user specified external threshold time can be achieved. The ASP specific tuning tables are used to assure that the user specified external threshold recovery time can be achieved on an ASP specific basis.

In the minimal impact environment, the system wide tuning table is used to maximize protection for indexes with minimal run-time performance impacts.

Bucket 1025 (225) is a special bucket that contains indexes that are always logged until a retuning indicates otherwise. Indexes that have a high rate of key change and are close to the internal time limit could cause a large number of alternating start and stop implicit log operations, which would degrade run-time performance. In order to obviate this problem, such indexes are placed in bucket 1025 (225).

The current exposure (215) is kept on a per processor basis and contains the amount of time each processor would spend to rebuild the indexes in the corresponding bucket and all lower numbered buckets. The maximum of the per processor current exposure values (215) is the maximum exposure (220) for that bucket.

For the minimal impact environment, the maximum exposure (220) is displayed to the user via the terminal interface (27). This value represents the recovery time currently achievable via the minimal impact environment.

For the fixed recovery environment the maximum exposure column (220) in the tuning table is searched until the greatest numbered bucket is found that has a value less than the user external threshold. The bucket containing this value then becomes the new internal rebuild time threshold.

FIG. 3 illustrates the process used to determine the recovery time for an example of the current system environment. The maximum value for a particular bucket is the maximum sum from the previous buckets added to the minimum current exposure value from the current bucket. Then the next largest value in the previous sum is added to the next smallest value of the per processor current exposure values. This continues until all CPUs are accounted for. The maximum for the resulting sums is the maximum exposure for that bucket. Using this method, the maximum exposure for any bucket accounts for the rebuild times of indices for that bucket and all previous buckets. Note that for retuning in the fixed recovery environment, the benefit of using this process only requires the calculation of current and maximum exposure up to the point where the maximum exposure exceeds the external threshold. The immediately prior bucket is now the internal rebuild time threshold, and thus these values need not be calculated for the entire tuning table at each retuning.

Figure 4A:
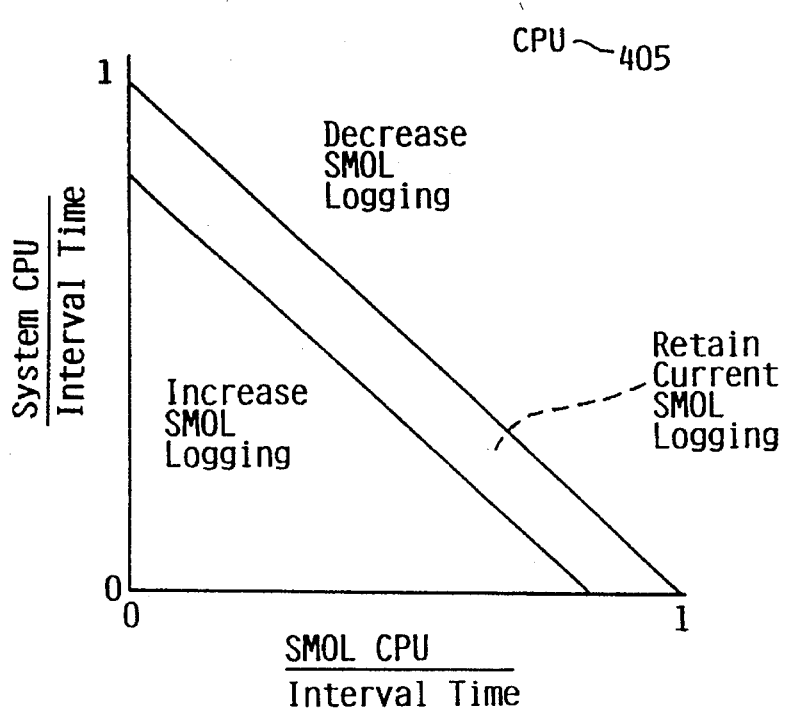
FIGS. 4 illustrates the impact of logging on system performance in the minimal impact environment.
Figure 4B:
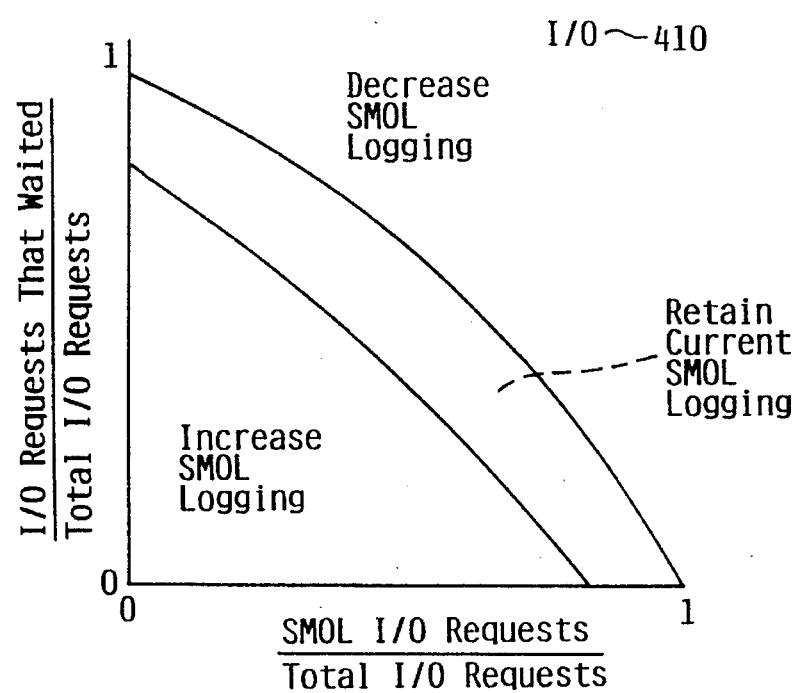
Figure 4C:
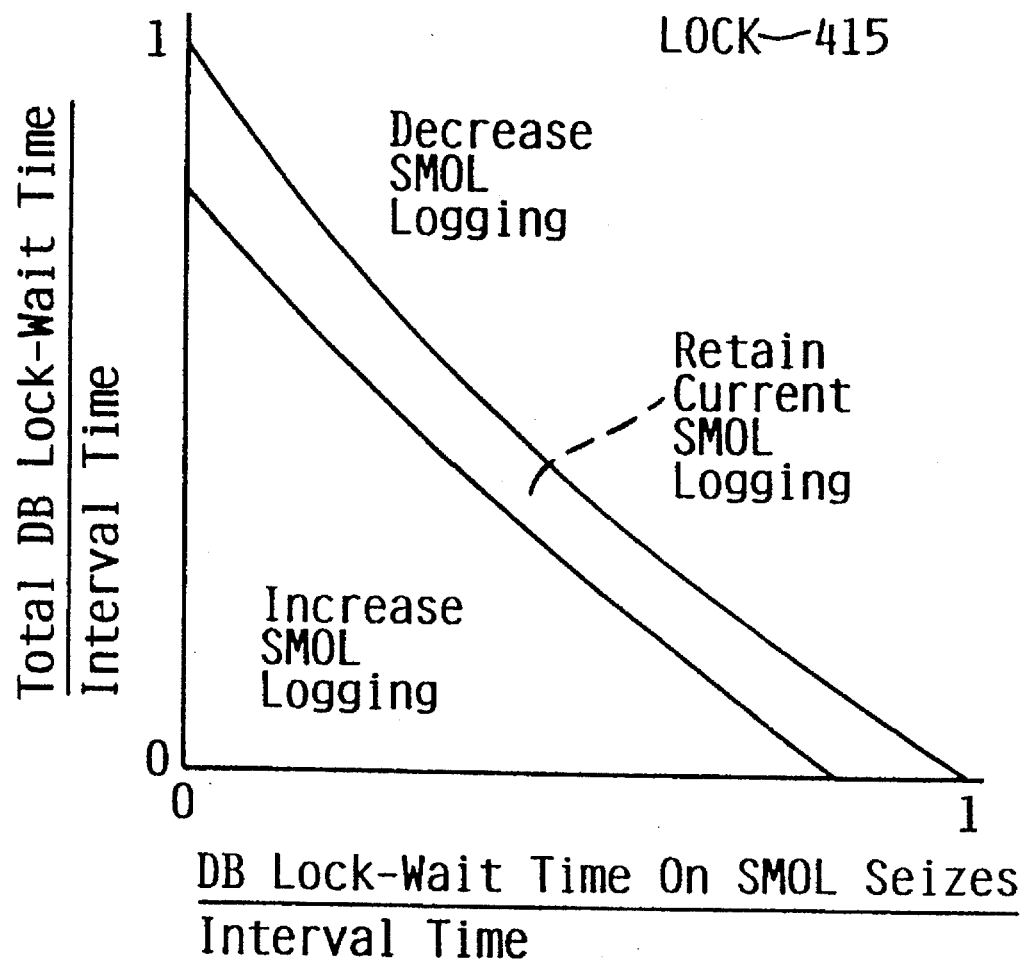

FIG. 4 illustrates the three performance parameters that indicate the performance impact of logging on the system in the minimal impact environment. The performance of any process on a computer system is effected by the available CPU to run the process (405), the number of I/Os the process generates (410), and the quantity of lock wait time (415). Therefore, these three parameters gate dynamic tuning changes for the minimal impact environment. These three charts can each be thought of as a two dimensional array of sufficient size to produce a 1% granularity on the axis of the chart, i.e. 100 by 100 elements. Each element of the array can then be set to one of three states, which indicate whether too many, too few, or an appropriate number of objects are being logged. The values calculated for the axis of the chart are the indices into the two dimensional array.

The axis of the charts are always expressed as a ratio of a total value. This is to avoid multiple arrays based on particular hardware configurations. In other words, the system management of logging is permitted the same percentages of the CPU, I/O, and lock wait contention, on a low performance computer as on a high performance computer. The resource allotted to the system management of logging will not be the same absolute value on two differing systems, but will be the same percentage of total resource available in a fixed time interval.

Interval time is the length of time between gathering of statistics for the CPU, I/O, and lock parameters. This is a real time value with units of seconds.

System CPU is the total quantity of time in seconds that the system CPU was active during the interval time. When the computer system has multiple processors, system CPU is the average CPU time of all the active processors.

SMOL CPU (System Managed Object Logging CPU) is that quantity of system CPU that is directly related to system managed object logging activities during the interval time.

Total I/O requests is the total number of system I/O requests in the time interval.

I/O requests that waited is the total number of system I/O requests in the time interval that had to wait before they could be performed.

SMOL (System Managed Object Logging) I/O Requests is the total number of I/O requests attributable to system managed object logging that occurred in the time interval.

Total DB (database) lock-wait time is the lock time attributable to table and index locks, regardless of whether or not they are logged.

DB lock-wait time on SMOL (System Managed Object Logging) locks is the lock wait time attributable to table and index locks attributable to SMOL functions in the interval time.

FIG. 5 shows the Exposed Object Index (EOI) entry formats for each exposed index. All indexes are added to the Exposed Object Index when they become exposed and removed when they are no longer exposed. Every exposed object has two entries: one of type '00' and one of type '01'. Type '00' entries are ordered by estimated rebuild time to facilitate construction of the system wide tuning table, while entries of type '01' are ordered by ASPS, then by estimated rebuild time to facilitate construction of the ASP specific tuning tables. Entries are retrieved from the exposed object index in order to calculate the current exposure fields of the tuning table. Entry types '02' and '03' are present in the EOI if an index is eligible as a logging surrogate candidate, and these entries are used to calculate if surrogate indexes are available. The rate of key change (505) is an indicator of how many updates are being done to the object per unit of time.

Figure 6A:
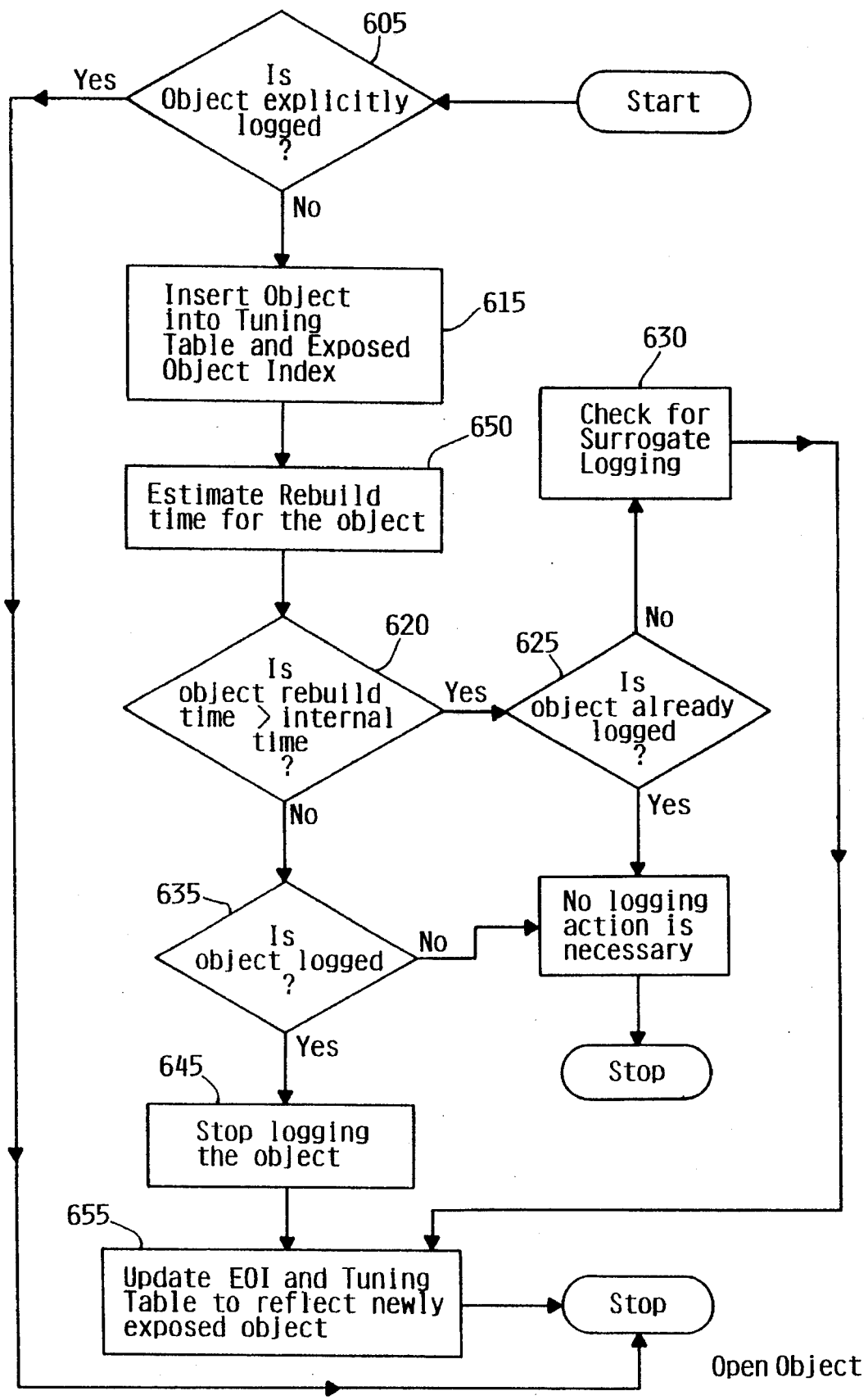
FIGS. 6a, b and c are flow diagrams of the log managing that occurs when an object becomes exposed.
Figure 6B:
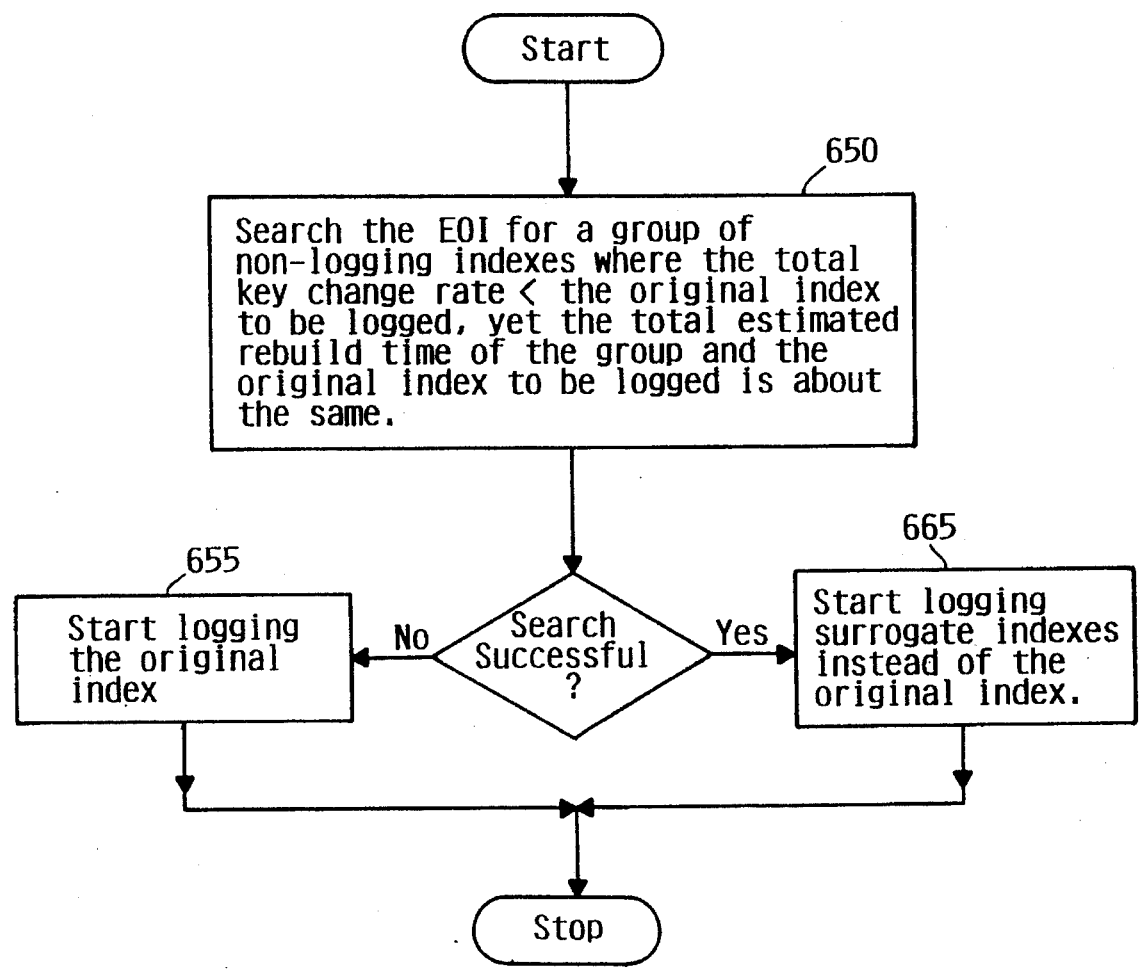

FIGS. 6a and 6b are flow diagrams of the log management that occurs when an object becomes exposed. An object becomes exposed when it would need recovery were the system to abnormally terminate. As an example, when an object is opened for update processing it may become exposed. If the user has already explicitly logged the object (605), then the object is not a candidate for implicit logging. If the object is not explicitly logged, then it is placed into the EOI and Tuning Table (615) and an estimate for the amount of time to rebuild the object is done (650). If the time to rebuild the object is less than or equal to the internal rebuild time threshold (620) then if the object is already implicitly logged (635) the logging is stopped (645) and the EOI and tuning table are updated (655). If the time to rebuild the object is greater than the internal time threshold (620), then if the object is not already logged (625) it will be logged unless surrogates should be logged instead (630), and the EOI and tuning table are updated (655).

The estimate for the index rebuild time (650) is done by mathematically approximating the actual costs that will be incurred to rebuild the index in terms of both CPU and I/O. The model used for this approximation is highly variable depending on the particular implementation. See APPENDIX 1 for further detail regarding calculation of rebuild time (650).

Surrogate logging (FIG. 6b) is the logging of up to 5 indexes in place of another index that is to be logged for recovery protection. The EOI is searched for a group of non-logged indexes that have a total key change rate substantially less than the original exposed index to be logged. This surrogate group must have about the same total estimated rebuild time as the original exposed index (650). A high rate of key change means that many updates to the object are being done, which means that many log entries will have to be done, which degrades run-time performance. Picking surrogate indexes with a lower rate of key change, but about the same estimated rebuild time, accomplishes the objective of reducing recovery time, but with a lower run-time performance impact. If the search for surrogate indexes is successful, the surrogate indexes are logged instead of the original index (665). If the search for surrogate indexes is unsuccessful, the original index is logged (655).

Figure 6C:
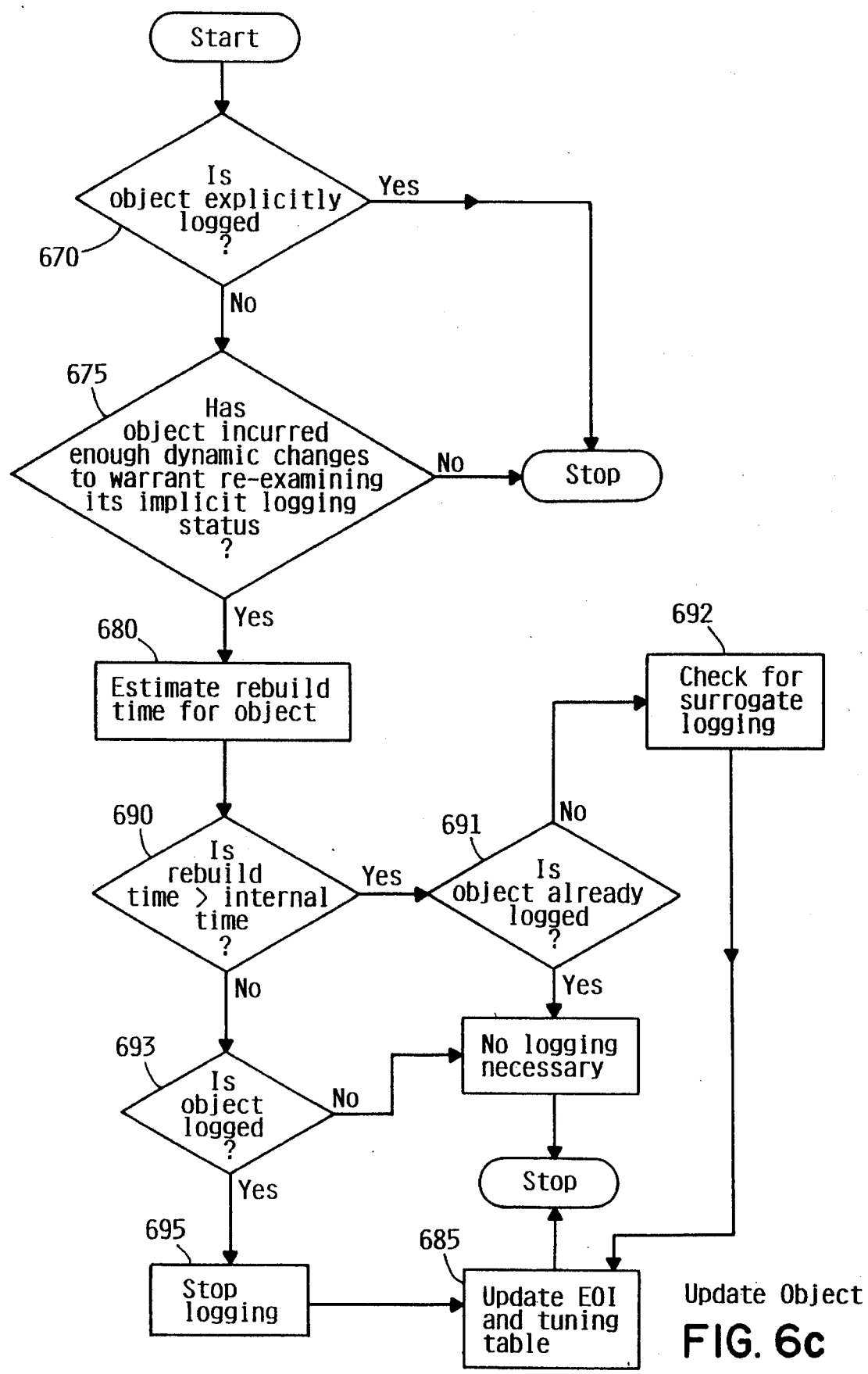

FIG. 6c is a flow diagram of the log management that occurs when an object is updated. If the user has already explicitly logged the object (670), then the object is not a candidate for implicit logging. If the object incurred enough dynamic change to warrant re-examining its implicit logging status (675) then the rebuild time for the object is estimated (680). If the rebuild time is greater than the internal rebuild time threshold (690) and the object is not already logged (691) then the possibility of surrogate logging must be investigated (692) and the EOI and tuning table is updated (685). If the rebuild time not greater than the internal time threshold (690) and the object is logged (693) then logging is stopped for this object (695) and the EOI and tuning table is updated (685).

Figure 7:
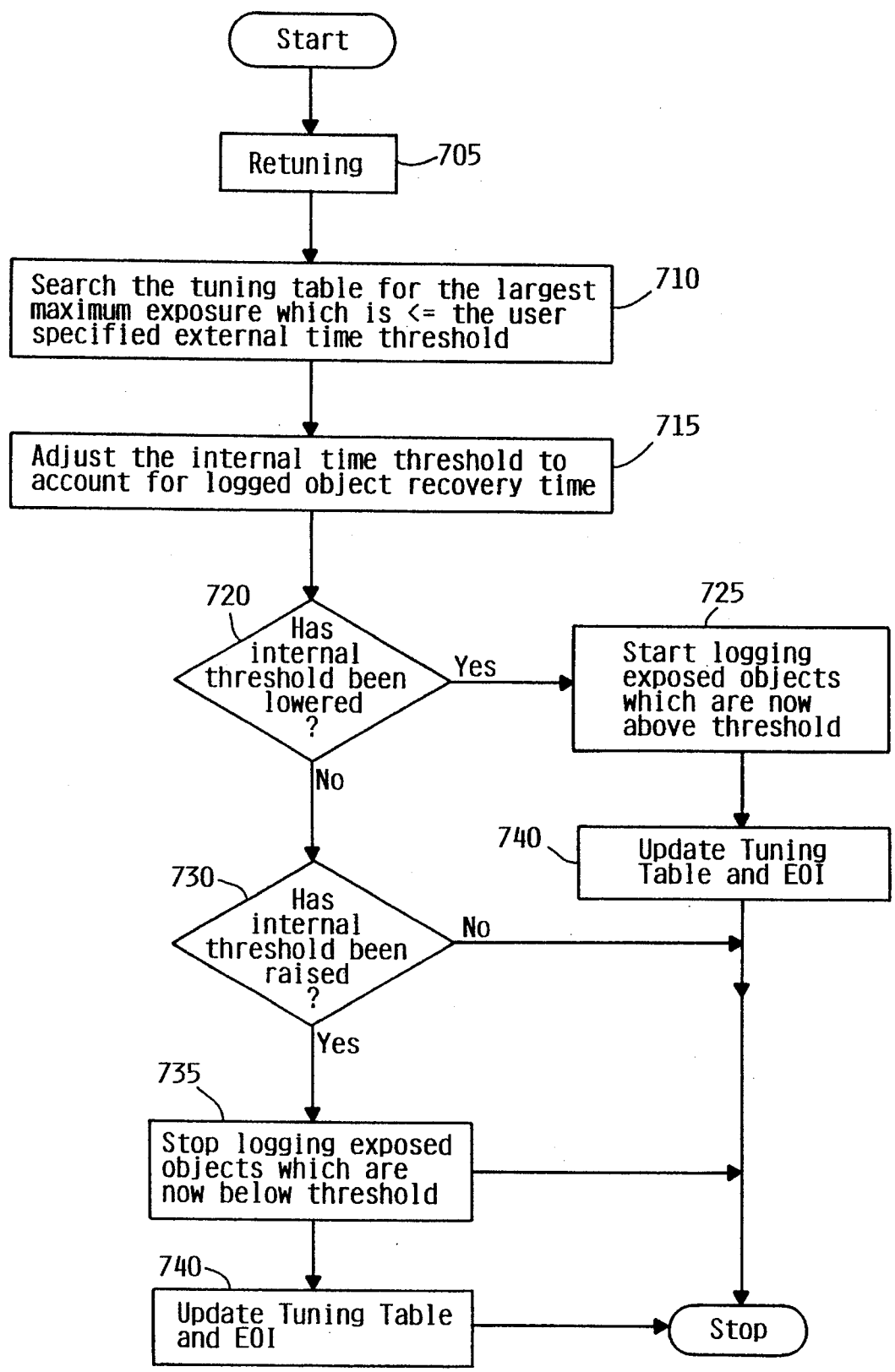
FIG. 7 is a flow diagram for the fixed recovery time environment when the user wishes to change the external time for recovery.

FIG. 7 is a flow diagram for the Fixed Recovery Time environment when the user wishes to change the external time. The Tuning Table fields, including the maximum exposure, are recalculated based on the current system environment (705). The Tuning Table is searched for the largest maximum exposure which is less than or equal to the user specified external time threshold (710). The internal time threshold is adjusted to account for the recovery time for logged indexes (715). This is necessary because even though an index is logged, it still takes a small amount of time to do recovery for it. If the internal time threshold is reduced to a lower numbered bucket (720), then exposed objects whose estimated rebuild times that are now above the threshold are logged (725). If the internal threshold has been increased to a higher numbered bucket (730), then exposed objects whose estimated rebuild times that are now below the new threshold are no longer logged (735). If the threshold has been lowered or raised, then the EOI and tuning table is updated (740).

FIG. 8 is a flow diagram for the Fixed Recovery Time environment when the system determines whether or not the user's external time for recovery will be met. If the recovery time due to non-logged objects is greater than the user specified external threshold (890) then a retuning operation (830) is done. Then the tuning table is searched for the largest maximum exposure which is less than or equal to the user specified external threshold (815). The internal time threshold is adjusted to account for the recovery time for logged indexes (820). This is necessary because even though an index is logged, it still takes a small amount of time to do recovery for it. If the internal rebuild time threshold has been reduced (825) then logging of exposed objects is started (835), the tuning table and EOI is updated (875), and then the system waits for a fixed interval of time (15 minutes in the preferred embodiment) (855).

If the internal rebuild time threshold has not been reduced (825) then a recalibration (845) and retuning (830) are done, the tuning table is searched for the largest maximum exposure that is less than or equal to the user specified external threshold (831), and the internal rebuild time threshold is adjusted to allowed for logged object recovery time (833). Then Exposed objects are logged (835), the tuning table and EOI are updated (875), and then the system waits for a fixed interval of time (15 minutes in the preferred embodiment) (855).

If the recovery time due to non-logged objects is not greater than the user specified external threshold (890), then if it is time for a periodic tuning (885) and the recovery time is much less than the user specified external time threshold (880), then a retuning (830) is done and the tuning table is searched for the largest maximum exposure that is less than or equal to the user specified external threshold (870). The internal time threshold is adjusted to allow for logged object recovery time (865). If the internal threshold has been reduced (895) then logging of the exposed object that are now above the internal threshold is started (860), the tuning table and EOI are updated (875) and then the system waits for a fixed interval of time (15 minutes in the preferred embodiment) (855). If the internal threshold has not been reduced (895) and the internal threshold has been increased (840) then logging of exposed objects that are now below the threshold is stopped (850), the tuning table and EOI are updated, and then the system waits for a fixed interval of time (15 minutes in the preferred embodiment) (855). If the internal threshold has not been increased (840) then the system waits for a fixed interval of time (15 minutes in the preferred embodiment) (855).

If it is not time for a periodic tuning (885) then the system waits for a fixed interval of time (15 minutes in the preferred embodiment) (855).

Retuning (830) is the recalculation of the current exposure and maximum exposure fields in the tuning table using the EOI fields as input. Retuning occurs because it has been determined that a new internal rebuild time threshold is necessary, so the information in the tuning table must be number of indexes per bucket. This increases the granularity of the buckets and thus improves the accuracy of the internal rebuild time threshold when it must be chosen near those buckets. Retuning is a necessary step after recalibration is performed. The recalibration is only performed if the maximum number of indexes in a bucket has exceeded the average maximum number of indexes per bucket and at least one bucket contains more than one index.

FIG. 9 is a flow diagram for the Minimal Impact environment where the system determines whether or not the run-time performance degradation is acceptable. The system performance parameters are collected (905) If, after calculating (910) the indices for all three arrays (405, 410 and 415), any of the three arrays indicate that too many objects are being logged (945), then if adjusting the internal time threshold would cause logging of more than one index to cease (940), then recalibration (920) and retuning (927) are done. The internal threshold is adjusted to at least one less index (930), logging for the object(s) is stopped (965), and the tuning table and EOI are updated (955). Finally, the system waits for a fixed interval of time (5 minutes in the preferred embodiment) (990). If adjusting the internal time threshold would not cause logging of more than one index to cease (940), then the recalibration (920) and retuning (927) steps are skipped.

If the three arrays indicate that additional objects may be logged (945), then if adjusting the internal time threshold would cause logging of more than one additional index (950), then recalibration (925) and retuning (929) are done. The internal threshold is adjusted to at least one more index (935), logging for the object(s) is started (960), and the tuning table and EOI are updated (955). Finally, the system waits for a fixed interval of time (5 minutes in the preferred embodiment) (990). If adjusting the internal time threshold would cause the logging of one more index to start (950), then the recalibration (925) and retuning (929) steps are skipped.

The minimal impact environment may encounter the case where an index is logged and performance is so degraded that, in the next time interval, it is decided to cease the logging. However, ceasing to log that particular index so improved performance that now it seems acceptable to log the index again. Once the index is logged performance again degrades and the cycle continues with one index incurring a start or stop log every timing interval. A method must be provided to avoid the cycle.

The basic technique is to save the Internal Threshold and the coordinates calculated for the axis of the tuning charts for the previous two tuning intervals. If the Internal Threshold is to be raised such that a new index will be logged then the oldest saved axis coordinates are compared to those calculated for the current timing interval. If the newly calculated axis coordinates are all within a small delta (approximately less than 3 per cent) of the oldest saved axis values then the Internal Threshold is not adjusted and the index does not start logging. Logging the index would decrease system performance such that the index would have to stop logging in the next timing interval. Note that the coordinates of the axis of the performance charts must be saved to distinguish between a logging cycle and an actual decrease in system demand such that more indexes can actually be logged. If only the Internal Thresholds were saved the distinction could not be made.

While the present invention has been described in terms of a preferred embodiment, it will be recognized that alternative embodiments are within the scope of the invention as claimed.

What is claimed is:

1. An object recovery mechanism in a computer system, comprising:

means for determining and maintaining rebuild information representative of an amount of time associated with each respective object which would be required to rebuild said respective object in the event data contained in said object becomes lost, wherein said rebuild information further comprises an estimated time;

means for selectively logging changes to objects in a non-volatile log, wherein objects are selected for logging based on said rebuild information, wherein said means for logging further comprises means for determining and maintaining a threshold time and means for selecting objects that have a rebuild time greater than said threshold time such that changes to such selected objects are logged; and means for recovering objects from said logged changes recorded in said non-volatile log in the event data contained in said objects becomes lost.

2. The mechanism of claim 1, wherein said means for selecting objects further comprises:

means for monitoring the rate of changes to objects;

means for forming a group of non-logged objects having a low rate of change and having a rebuild time less than said threshold time; and means for substituting said group of objects for a logged object having a high rate of change such that the substituted objects are logged and the object having a high rate of change is not logged.

3. The mechanism of claim 2, wherein the objects to be logged comprise indexes to databases.

4. The mechanism of claim 1, and further comprising:

means for monitoring performance of the computer system, and wherein the means for maintaining the threshold time adjusts said time to minimize performance degradation caused by said logging of changes to objects.

5. The mechanism of claim 4 and further comprising:

means for permitting a user to select a minimal impact environment option, and wherein said threshold time is selected based on minimizing the effect of logging on system performance.

6. The mechanism of claim 5, wherein said means for selecting objects further comprises:

means for monitoring tile rate of changes to objects;

means for forming a group of non-logged objects having a low rate of change and having a rebuild time less than said threshold time; and means for substituting said group of objects for a logged object having a high rate of change such that the substituted objects are logged and the object having a high rate of change is not logged.

7. The mechanism of claim 6, wherein the objects to be logged comprise indexes to databases.

8. The mechanism of claim 1 and further comprising:

means for permitting a user to select a desired maximum recovery time for restarting the computer system following an unplanned shutdown, and wherein said threshold time is selected based on said desired recovery time.

9. An computer system comprising:

at least one central processing unit (CPU);

main memory coupled to said CPU;

nonvolatile storage coupled to said CPU;

means for determining and maintaining rebuild information representative of an amount of time associated with each respective object which would be required to rebuild said respective object in the event data contained in said object becomes lost, and wherein said rebuild information further comprises an estimated time;

means for selectively logging changes to objects in a log contained in said non-volatile storage, wherein objects are selected for logging based on said rebuild information, wherein said means for logging further comprises means for maintaining a threshold time and means for selecting objects that have a rebuild time greater than said threshold time such that changes to such selected objects are logged; and means for recovering objects from said logged changes recorded in said non-volatile log in the event data contained in said objects becomes lost.

10. The mechanism of claim 9, wherein said means for selecting objects further comprises:

means for monitoring the rate of changes to objects;

means for forming a group of non-logged objects having a low rate of change and having a rebuild time less than said threshold time; and means for substituting said group of objects for a logged object having a high rate of change such that the substituted objects are logged and the object having a high rate of change is not logged.

11. The mechanism of claim 10, wherein the objects to be logged comprise indexes to databases.

12. The mechanism of claim 9, and further comprising:

means for monitoring performance of the computer system, and wherein the means for maintaining the threshold time adjusts said time to minimize performance degradation caused by said logging of changes to objects.

13. The mechanism of claim 12 and further comprising:

means for permitting a user to select a minimal impact environment option, and wherein said threshold time is selected based on minimizing the effect of logging on system performance.

14. The mechanism of claim 13, wherein said means for selecting objects further comprises:

means for monitoring the rate of changes to objects;

means for forming a group of non-logged objects having a low rate of change and having a rebuild time less than said threshold time; and means for substituting said group of objects for a logged object having a high rate of change such that the substituted objects are logged and the object having a high rate of change is not logged.

15. The mechanism of claim 14, wherein the objects to be logged comprise indexes to databases.

16. The computer system of claim 9, wherein said nonvolatile storage comprises a plurality of storage pools, and wherein the system further comprises:

means for assigning objects to storage pools; and wherein each storage pool is logged independently of the other storage pools.

17. A method of object recovered mechanism in a computer system, comprising the machine executed steps of:

determining and maintaining rebuild information representative of an amount of time associated with each respective object which would be required to rebuild said respective object in the event data contained in said object becomes lost, wherein said rebuild information comprises an estimated time;

selectively logging changes to objects in a non-volatile log, wherein objects are selected for logging based on said rebuild information, and wherein said logging step further comprises maintaining a threshold time and selecting objects that have a rebuild time greater than said threshold time such that changes to such selected objects are logged; and recovering objects from said logged changes recorded in said non-volatile log in the event data contained in said objects becomes lost.

18. The method of claim 17, wherein said selecting step further comprises:

monitoring the rate of changes to objects;

forming a group of non-logged objects having a low rate of change and having a rebuild time less than said threshold time; and substituting said group of objects for a logged object having a high rate of change such that the substituted objects are logged and the object having a high rate of change is not logged.

19. The method of claim 18, wherein the objects to be logged comprise indexes to databases.

20. The method of claim 17, and further comprising:

monitoring performance of the computer system, and wherein said maintaining step adjusts said time to minimize performance degradation caused by said logging of changes to objects.

21. The method of claim 20 and further comprising:

permitting a user to select a minimal impact environment option, and wherein said threshold time is selected based on minimizing the effect of logging on system performance.

22. The method of claim 21, wherein said selecting step further comprises:

monitoring the rate of changes to objects;

forming a group of non-logged objects having a low rate of change and having a rebuild time less than said threshold time; and substituting said group of objects for a logged object having a high rate of change such that the substituted objects are logged and the object having a high rate of change is not logged.

23. The method of claim 22, wherein the objects to be logged comprise indexes to databases.

24. The method of claim 17 and further comprising:

permitting a user to select a desired maximum recovery time for restarting the computer system following an unplanned shutdown, and wherein said threshold time is selected based on said desired recovery time.

* * * * *